United States Patent [19]
Sluga

[11] 3,840,053
[45] Oct. 8, 1974

[54] INSIDE REPAIR CLAMP FOR LOW PRESSURE PIPING

[75] Inventor: William James Sluga, Mt. Jewett, Pa.

[73] Assignee: Dresser Industries, Inc., Dallas, Tex.

[22] Filed: Feb. 5, 1973

[21] Appl. No.: 329,518

[52] U.S. Cl. ................................................. 138/97
[51] Int. Cl. ............................................ F16l 55/18
[58] Field of Search ............................... 138/97, 98

[56] References Cited
UNITED STATES PATENTS

| 3,101,743 | 8/1063 | Hoke | 138/97 |
| 3,474,832 | 10/1969 | Broadhead et al. | 138/97 |
| 3,516,446 | 6/1970 | O'Hargan et al. | 138/97 |

Primary Examiner—James J. Gill
Assistant Examiner—Anthony V. Ciarlante
Attorney, Agent, or Firm—Daniel Rubin

[57] ABSTRACT

A clamp for the repair of pipe leaks in low pressure piping. An annular gasket seal is supported against the internal pipe surface axially spanning the area of leak. An annular backing ring extending widthwise as well as radially along the side walls of the gasket axially confined the gasket in a predetermined circumferential compression against the pipe wall.

8 Claims, 6 Drawing Figures

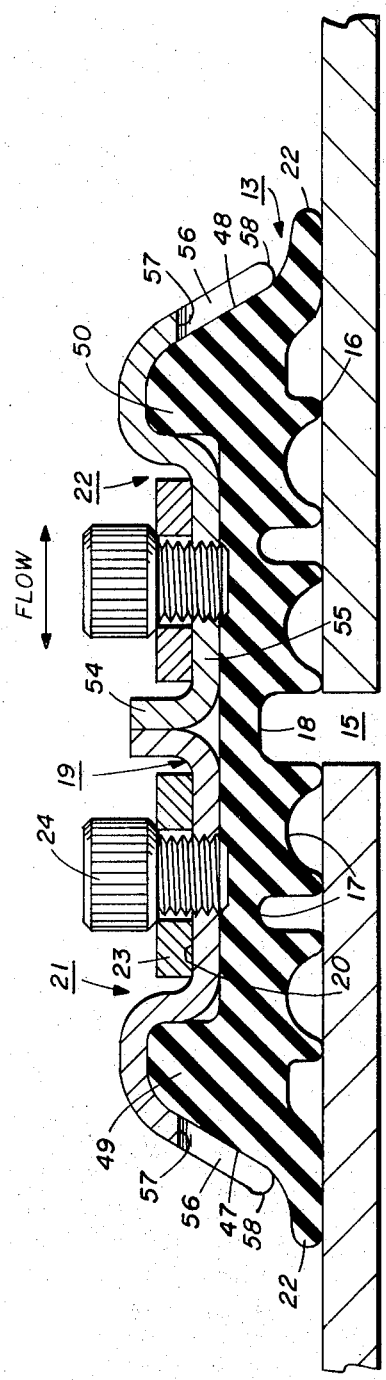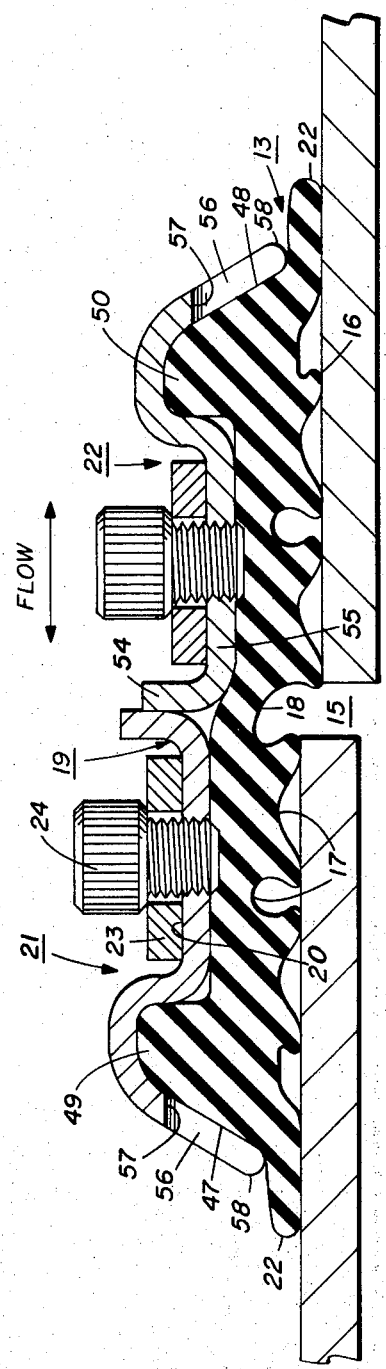

INSIDE REPAIR CLAMP FOR LOW PRESSURE PIPING

BACKGROUND OF THE INVENTION

1. The field of art to which the invention pertains includes the art of *Pipes and Tubular Conduits*, Patent Office class 138, and *Pipe Joints or Couplings*, Patent Office class 285.

2. Clamps for repair of pipe leaks at a joint or elsewhere in the system are well known in industry and are widely marketed commercially. It is customary to apply these prior type clamps to the external pipe surface in the vicinity of the leak whereby to effectively contain the pressurized line contents thereat. However, a frequent repair of this type relates to buried, underground piping wherein it is necessary to externally excavate in order to gain complete circumferential access to the leak site. Where only a single leak exists within the piping system, the cost of a single excavation is regarded as unavoidable and properly endured as a necessary expense. However, many of the buried pipe systems of this type are of large pipe size, frequently on the order of 24 inches and larger, for distributing low pressure gas to a major metropolitan city and have been in use for many years. Because of being buried, leaks can easily go undetected and after an extensive period of time, the pipes develop leaks generally throughout the entire system network. The usual location for such leaks is at the joint between pipe sections from which the joint compound or caulking has gradually given way by pipe settling, erosion or the like. While repair is usually considered more economically plausible than replacement of the entire system, an extensive old system literally requires thousands of clamps to effect a complete leakproof repair. It can be appreciated that where thousands of leaks exist in any known system, each separated from the next and the preceding by, for example, a length of pipe section, that the identical number of external excavations results in a near prohibitive repair cost. At the same time, the multiplicity of excavations frequently cause gross inconvenience both to local automobile traffic and possible prolonged interruption of pipe service.

A form of inside repair clamp for gas line piping is exemplified by Hoke patent U.S. Pat. No. 3,101,743. Likewise, a form of inside repair clamp for relatively high pressure water piping is exemplified by O'Hargan et al patent U.S. Pat. No. 3,516,446.

SUMMARY

This invention relates to a pipe repair clamp of the general type disclosed in the O'Hargan et al patent over which this clamp is an improvement particularly suitable for inside installation in a relatively low pressure system. More specifically, the invention relates to a repair clamp for use in a system in which line pressure is generally insufficient to aid or effect the required sealing force between the clamp and pipe. The clamp is particularly adapted for use within gas piping of cast iron or steel utilizing system pressures on the order of 1–25 psig. as compared to pressures on the order of 60–90 psig. normally associated with clamps of the O'Hargan et al patent. In being capable of inside repair, the costly expense of multiple excavation is avoided and instead requires only one major excavation at each terminal end of the piping system. With the ends exposed, the pipe, where of adequate size, can be serviced entirely on the interior. As a further benefit, the interruption of traffic and other public inconvenience as associated with prior type external clamps is minimized to a maximum. Moreover, the time required to complete repair on just the pipe per se is usually substantially less than with external clamps because of the reduced labor time involved. At the same time, the novel construction of the clamp hereof requires a minimum of assembled parts and offers a low radially extending profile which minimizes the pressure drop to the gas occasioned by its presence in the gas system.

It is therefore an object of the invention to provide a novel clamp for the repair of pipe leaks in a low pressure system.

It is a further object of the invention to provide a novel pipe repair clamp suitable for interior installation in a relatively low pressure gas distribution system as to generally provide a more economical repair with less inconvenience to the public than has been associated with prior type clamps.

It is yet a further object of the invention to provide an inside pipe repair clamp for gas line contents having a minimum radial profile to minimize the pressure drop associated with gas flow transversely thereacross.

BRIEF DESCRIPTION OF THE DRAWINGS

FIGS. 4 and 5 are each sectional elevations taken substantially along the coincident lines 4—4 and 5—5 respectively of FIG. 2 for different situations of installation;

Referring now to FIG. 1 there is illustrated a pipe 10 of cast iron or steel construction that might have been initially bell and spigot jointed when laid underground many years before. Within the pipe, extending around the interior periphery thereof, is a pipe clamp in accordance with the invention hereof and generally designated 11. For purposes of the discussion hereafter, the clamp disclosure will be described in conjunction with repairing leaks occurring at the gaps between pipe sections whereat a joint had previously been contained, it being understood that for repairing leaks elsewhere in the pipe wall, the clamp hereof can be constructed with even fewer components as will be explained.

Figure 1:
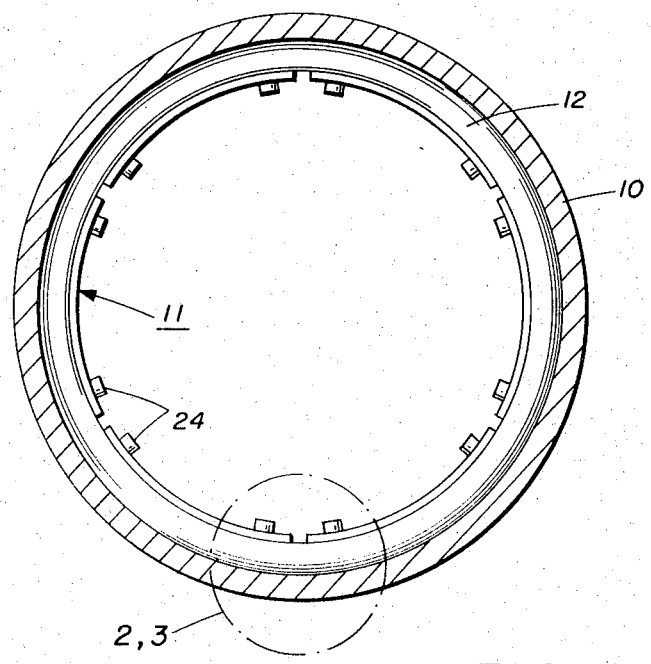
FIG. 1 is a sectional end elevation through a pipe containing the repair clamp in accordance herewith.

Referring more specifically to FIGS. 2–5, the clamp 11 hereof is comprised of an annular elastomeric sealing gasket 12 of a rubberized composition or a material otherwise compatible with the line contents served by the pipe being repaired. The gasket has a cross-sectional width sufficient to span the leak gap shown here at a joint 15 between pipe sections and to extend laterally onto the pipe wall at each side thereof a sufficient distance as will enable an adequate compressive sealing force thereon to be obtained. For purposes hereof it is preferred that the gap at joint 15 not exceed ¼ inch. At a ¼ inch pipe gap with 54 inch diameter pipe, an unstressed total cross-sectional width of about 6 ½ inches has been found adequate. When finally installed and compressed, this dimension was found to increase to about 7¼ inches.

The radially outer or exterior surface formation 13 of the gasket facing the inside pipe wall is critical to operability and is formed of a puckered shape adapted to normally effect individual series arranged seals in the axial direction of the pipe. As here shown, surface 13 comprises a plurality of axially displaced, annularly extending, alternate ribs or lips 16 and grooves 17 radially engaging the inside pipe surface. The ribs might also be regarded as hills 16 and velleys 17 providing a high degree of flexibility in response to circumferential compression as can be better appreciated by comparing the relative illustrations of FIGS. 4 and 5. Each of the axially outermost ribs 22 have a width of relatively thin radial unpuckered section adapted to flatly engage the inside pipe surface thereat. The latter ribs in turn merge with the more or less radially and axially inward extending concave side faces 47 and 48 to form flange ribs 49 and 50, respectively. This construction when sealed in the manner to be described prevents both outward leakage of the line contents and inward leakage from ground seepage while at the same time readily permits axial offset to exist between the pipe sections in the manner shown in FIG. 5. The gaskets are generally presized to fit the pipe which is to accommodate them and are initially set in place by hand. While it is preferable where used for sealing a pipe gap that surface 13 be situated generally symmetrical on each side of a center recess 18, this is not critical and need not necessarily be so.

In order to secure the gasket in place and effect adequate circumferential compression thereagainst, there is provided a circumferential ringlike backing member 19 positioned within an annular groove 20 axially centered between annular flange ribs 49 and 50 on the radially inner surface of the gasket. Backing member 19 may be axially comprised of a single unit but for gap sealing in the manner being described is preferably split by a pair of axially juxtaposed opposite hand channel-like units 21 and 22 for spanning the gasket width. This permits centering the split radially coincident with the gap for relative channel displacement as shown in FIG. 5. Each of the channel units to be operatively effective in accordance herewith consists of a more or less S-shaped integral cross-section extending from about the center of groove 20 to a wrap around compression engagement against respective side face 47 or 48 and its associated rib 49 or 50. Comprising the channel unit in section is an inner radially upstanding side flange 54 connecting with central flat spanning section 55 in turn connected with a wrap around dog leg 56 which extends radially toward the pipe wall to its terminal end 58. In this manner, leg 56 is effective for compressing and maintaining the gasket thereat into sealing engagement against the pipe wall while end 58 bears directly against end rib 22 to insure a positive seal engagement thereat. Preferably dog leg 56 is bifurcated at 57. At the same time, each or both channels are formed in their circumferential direction from an arc on a chord segment for substantially tandem end-to-end circular assembly which maintains the gasket under a predetermined degree of compression. As will be understood from the explanation below, this arrangement continuously holds the gasket in place against the transverse velocity component of the gas during in-service use of the system in providing substantially uniform gasket pressure across the gasket face. For 54 inch diameter pipe, approximately 12 segments per backing ring are usually employed to completely fill the inside circumferential extent of the gasket. Preferably, a 1/16-inch plastic shield of polypropylene or the like (not shown) is positioned between the channels and gasket for the width of groove 20. Such a shield when utilized serves to provide lubrication between the respective surfaces.

Securing the consecutive backing ring segments in end-to-end relation are a plurality of splice plates 23 likewise each in the form of an arc of a chord sufficient to span the abuttable ends of the tandem ring segments. The splice plates fit within the respective channel sides and are attached to the ring segments by means of socket head cap screws 24 which pass through plate apertures 25 and 26 into tapped holes 27 and 28 in the channel wall. It is to be noted that aperture 26 is of a circumferential extent greater than the diameter of screw 24 permitting an adjustable setting of the splice plate relative to the ring segment thereat.

Figure 6:
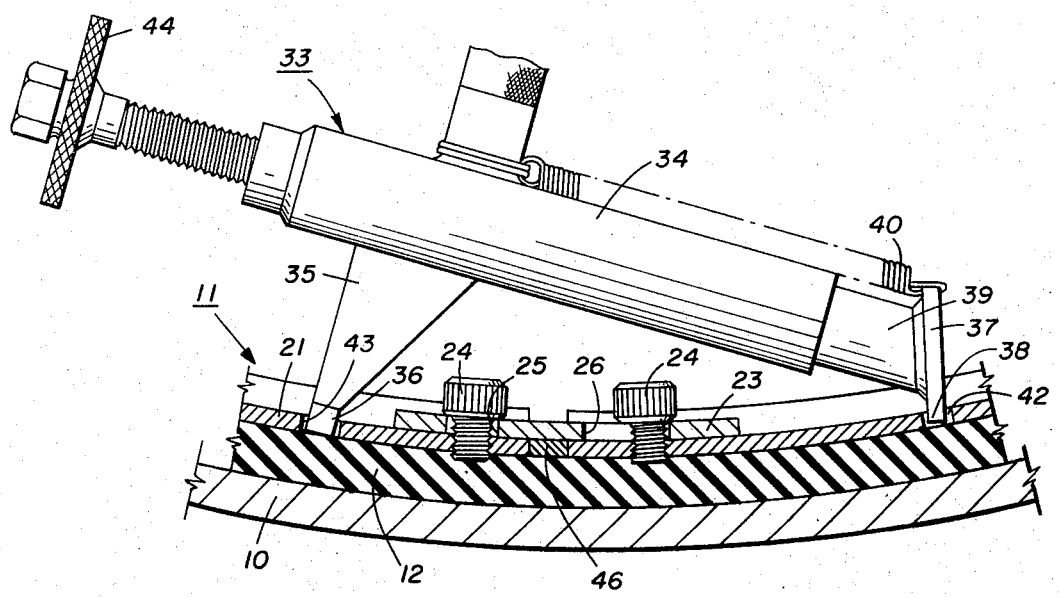
FIG. 6 is a sectional view similar to FIG. 2 indicating the method by which initial assembly of the clamp hereof is effected.

Initial predetermined, preset compression of backing ring 19 against the gasket 12 is obtained in the manner illustrated in FIG. 6 by a spreading tool 33 forming no part of the invention hereof. The tool is of a jack screw type and is commercially available or can be readily improvised for this purpose. Briefly and for discussion, the tool includes a body section 34 from which radially extends a flange 35 terminating in a foot 36. Near the other end of the tool is a second flange 37 likewise terminating in a foot 38 and mounted on a jack shaft 39 telescopically received within the body. Spring 40 connected to flange 37 urges its return toward the body.

Figure 2:
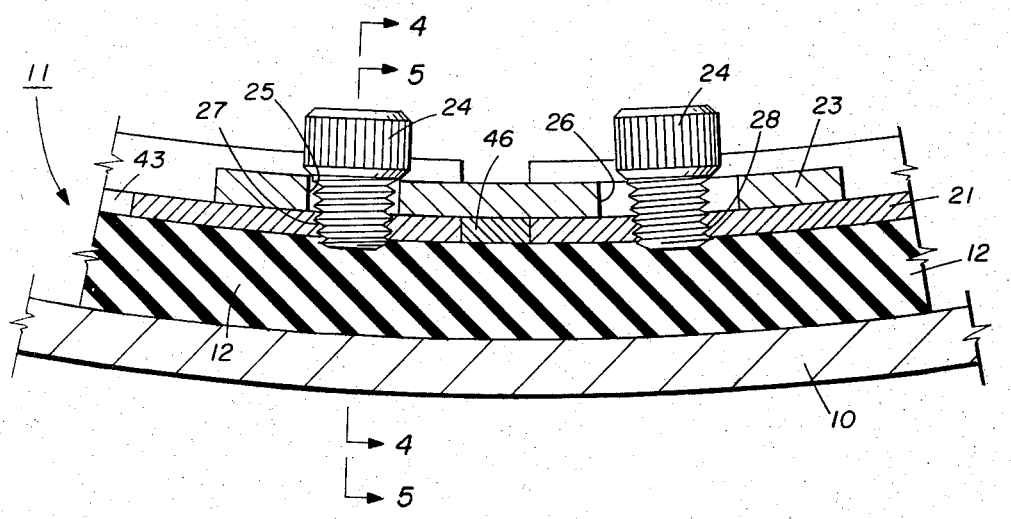
FIGS. 2 and 3 are each enlarged fragmentary sectional views taken from the portion indicated encircled on FIG. 1.
Figure 3:
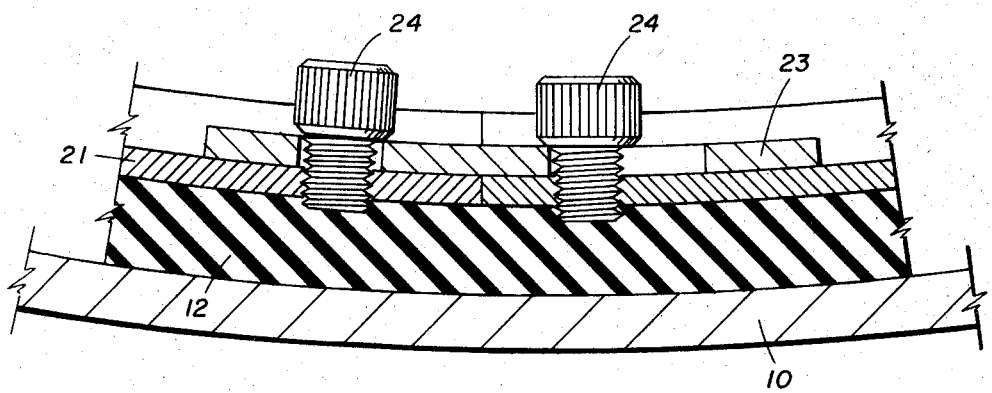

For accommodating the tool, each backing ring segment includes an aperture 42 and 43 near opposite ends thereof and which receive the tool in the manner shown. Hand wheel 44, when rotated, screws axially of the body and causes shaft 39 to extend or withdraw. As shaft 39 extends, it causes the affected adjacent segments to displaceably spread apart sufficiently to permit reception of a filler segment 46, as of a sawed off section of channel, therebetween. Only a sufficient number of filler segments are supplied to insure appropriate compression of gasket lips 16 against the pipe wall. A comparison of FIGS. 2 and 3 illustrate the abutting conditions with and without the filler member respectively. After a sufficient number of filler pieces has been inserted, the installation is complete to provide substantially uniform gasket pressure across the gasket face and eliminate possibilities of leakage.

By the above description, there has been disclosed a novel pipe repair clamp specifically adapted for use with large size relatively low pressure pipe carrying natural gas or the like. The clamp is relatively simple in construction and is operatively effective without depending on line pressure to enhance or maintain gasket sealing pressure. It is easily installed with a minimum of labor and expense without the attendant problem of a plurality of excavations associated with such prior art devices. The low profile of the clamp minimizes pressure loss to the gas flow passing thereover and in an embodiment of the size described above, extends radially inward approximately 1 ⅝ inches from the pipe wall to the top of the head screw. This dimension could be more or less depending on circumstances of the installation and what pressure drops can be tolerated by the system.

Since many changes could be made in the above construction and many apparently widely different embodiments of this invention could be made without departing from the scope thereof, it is intended that all matter contained in the drawing and specification shall be interpreted as illustrative and not in a limiting sense.

The embodiments of the invention in which an exclusive property or privelege is claimed are defined as follows:

1. In an inside clamp for repair of a leak gap in a piping system including an annular flexible gasket having a puckered radially outer surface for engagement against an inner pipe wall spanning a leak gap thereat; and an annular backing member circumferentially extending about the radially inner surface of said gasket in circumferential compressive relation thereagainst for effecting a predetermined sealing pressure between the engaging surfaces of said gasket and pipe wall, the improvement in which the axial ends of said gasket include a relatively thin radial section of substantially unpuckered contour on its radially outer surface and said backing member in cross-section includes a portion that generally spans the width of said inner gasket surface to axially confine the width of said outer surface for uniformly maintaining the sealing pressure thereof and including a leg extending integrally from each axial end of the gasket spanning portion radially outward in axially confining relation with the side walls of said gasket axially inward of the gasket end thereof and adapted to radially engage the axial gasket end for affecting a forced sealing engagement between the engaging surfaces of the axial gasket end and pipe wall.

2. The improvement according to claim 1 in which said gasket is centrally recessed between spaced ribs on the inner gasket surface to receive said backing member, and said backing member in cross-section extends in closely confining wrap around relation about each of the spaced ribs from said recess in the vicinity of where each leg extends from the respective end of said spanning portion.

3. The improvement according to claim 2 in which the backing member is circumferentially split in width into contiguous sections along a plane for support substantially radially coextensive with the pipe gap to be repaired.

4. The improvement according to claim 3 in which each contiguous section is of a more-or-less 5-shaped cross-section.

5. The improvement according to claim 2 in which said backing member is comprised of a plurality of assembled end-to-end arc on chord segments.

6. The improvement according to claim 5 in which fillers are contained between at least some of said end-to-end segments to effect a predetermined circumferential compressive relation of the backing member against said gasket.

7. The improvement according to claim 5 including a splice plate overyling the ends of adjacent segments securing said segments in assembled relation and having circumferentially spaced apertures through which to receive screws for screwed securement to each of the respective adjacent segments.

8. The improvement according to claim 7 in which at least one of the apertures in said splice plate has a circumferential extent substantially greater than the screw diameter to be received therein permitting circumferentially adjustable setting of a segment relative thereto.

* * * * *